United States Patent
Matsumoto

(10) Patent No.: US 11,091,197 B2
(45) Date of Patent: Aug. 17, 2021

(54) DRIVING SUPPORT APPARATUS

(71) Applicant: DENSO CORPORATION, Kariya (JP)

(72) Inventor: Yusuke Matsumoto, Kariya (JP)

(73) Assignee: DENSO CORPORATION, Kariya (JP)

(*) Notice: Subject to any disclaimer, the term of this patent is extended or adjusted under 35 U.S.C. 154(b) by 165 days.

(21) Appl. No.: 16/315,328

(22) PCT Filed: Jun. 30, 2017

(86) PCT No.: PCT/JP2017/024263
§ 371 (c)(1),
(2) Date: Jan. 4, 2019

(87) PCT Pub. No.: WO2018/008564
PCT Pub. Date: Jan. 11, 2018

(65) Prior Publication Data
US 2019/0210643 A1 Jul. 11, 2019

(30) Foreign Application Priority Data
Jul. 7, 2016 (JP) .............. JP2016-135155

(51) Int. Cl.
*B62D 6/00* (2006.01)
*B62D 5/04* (2006.01)
(Continued)

(52) U.S. Cl.
CPC .............. *B62D 6/002* (2013.01); *B60R 21/00* (2013.01); *B62D 5/046* (2013.01); *B62D 6/001* (2013.01); *G08G 1/16* (2013.01)

(58) Field of Classification Search
CPC .......... G01S 13/58; G01S 13/86; G01S 13/93; G06K 9/798; G06K 9/6217; B60W 30/10;
(Continued)

(56) References Cited

U.S. PATENT DOCUMENTS

2010/0098295 A1* 4/2010 Zhang ................ G06K 9/00798
382/103
2013/0173232 A1* 7/2013 Meis ...................... G08G 1/167
703/2

(Continued)

FOREIGN PATENT DOCUMENTS

| JP | 2015-045622 A | 3/2015 |
| JP | 5711721 B2 | 5/2015 |
| JP | 2016-000602 A | 1/2016 |

*Primary Examiner* — Nicholas K Wiltey
*Assistant Examiner* — Terry C Buse
(74) *Attorney, Agent, or Firm* — Maschoff Brennan

(57) ABSTRACT

A detection ECU detects left and right lane lines that define a driving lane from an image captured by an in-vehicle camera, by detecting a roadside as a side of a road where the own vehicle travels, from information of reflected waves received from a radar device. The detection ECU determines whether an estimated width indicating the width of a detected roadside and a detected lane line on a roadside side is narrower than the predetermined width. When the detection ECU determines that the estimated width is narrower than the predetermined width, it sets the predetermined position to be a position distant from the lane line on a roadside side in the estimated driving lane, than when the estimated width is determined not to be narrower than the predetermined width.

4 Claims, 2 Drawing Sheets

(51) Int. Cl.
*B60R 21/00* (2006.01)
*G08G 1/16* (2006.01)

(58) Field of Classification Search
CPC .............. B60W 30/95; B60W 30/12; B60W 2050/143; B60W 2420/42; B60W 2520/10; B60W 2540/18; B60W 30/14; B60W 30/095; B60W 40/06; B60R 21/00; B62D 6/00; B62D 5/46; B62D 6/02; B62D 6/01; G08G 1/16
USPC ........................................................ 701/44
See application file for complete search history.

(56) References Cited

U.S. PATENT DOCUMENTS

| | | | |
|---|---|---|---|
| 2013/0184976 A1* | 7/2013 | Akiyama | B62D 15/025 701/116 |
| 2013/0274959 A1* | 10/2013 | Igarashi | G08G 1/096861 701/1 |
| 2014/0156158 A1 | 6/2014 | Matsuno | |
| 2015/0063648 A1 | 3/2015 | Minemura et al. | |
| 2018/0037224 A1* | 2/2018 | Bogner | B60W 50/14 |
| 2018/0181818 A1* | 6/2018 | Shimotani | G06T 7/70 |

* cited by examiner

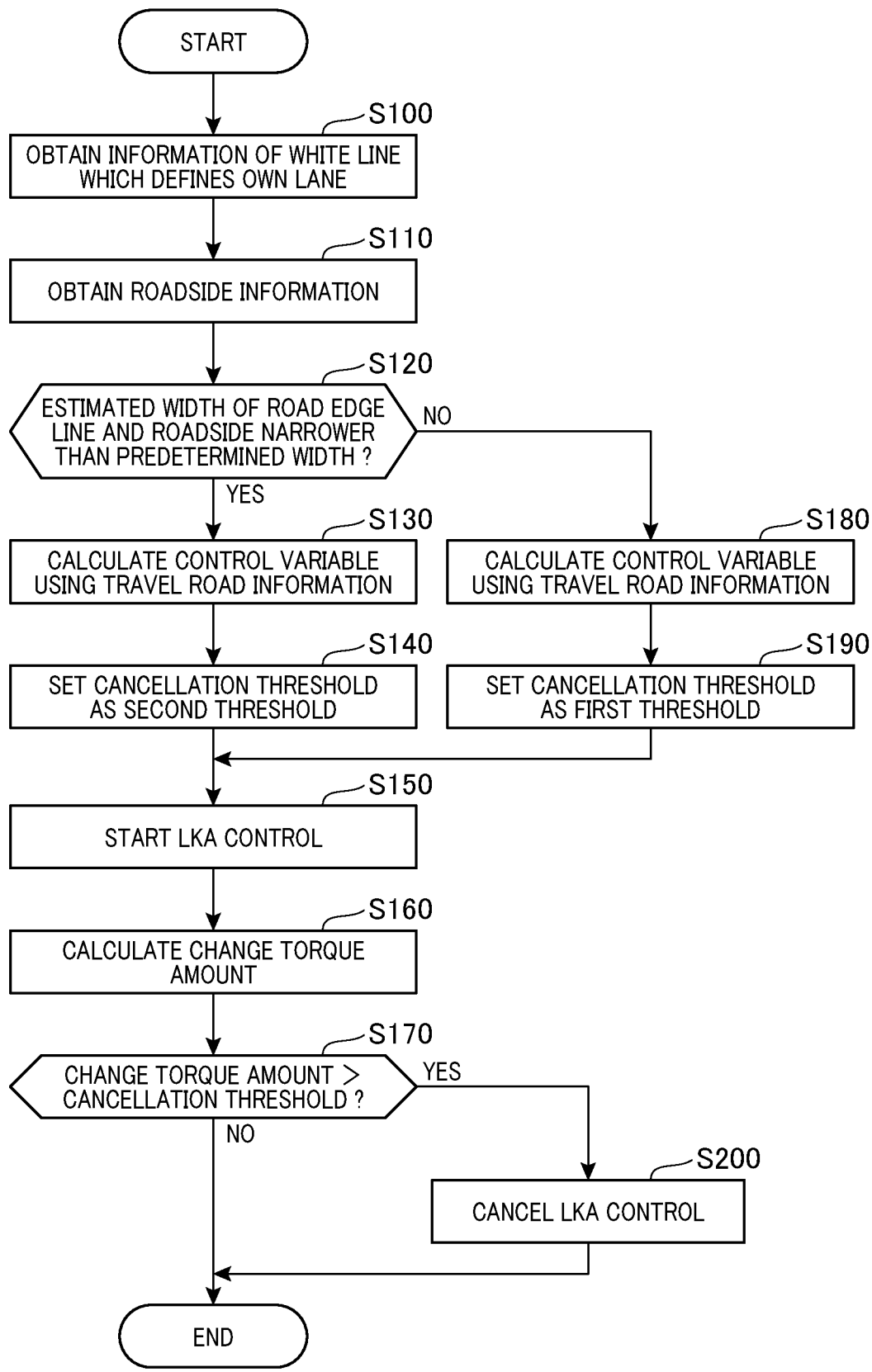

DRIVING SUPPORT APPARATUS

CROSS-REFERENCE TO RELATED APPLICATIONS

This application is a national stage application of PCT Application No. PCT/JP2017/024263, filed Jun. 30, 2017, which claims priority to Japanese Patent Application No. 2016-135155, filed Jul. 7, 2016, the description of which is incorporated herein by reference.

TECHNICAL FIELD

The present disclosure relates to a driving support apparatus that is mounted to a vehicle to detect lane lines that define lanes, and cause the vehicle to perform driving support based on the detected lane lines.

BACKGROUND ART

For example, a road shape recognition device described in Patent Literature 1 recognizes a white line of a lane from image information captured by a camera, on which the own vehicle is traveling. A driving lane is estimated based on white line information, then a travel trajectory of the own vehicle is estimated.

CITATION LIST

Patent Literature

[PTL1]: JP 5711721 B

SUMMARY OF THE INVENTION

Let us assume a case where the own vehicle is traveling on a road having a roadside, as being a side of the road, provided with walls or guardrails. In this case, when a wall or a guardrail on the roadside is included in image information captured by a camera, a pattern of the wall or an uneven part of the guardrail may be erroneously recognized as being a white line (road edge line which marks a roadside) of the lane. Patent Literature 1 does not mention the problem of erroneously recognizing the pattern of a wall or the unevenness of a guardrail as a white line of a road and does not disclose or suggest a countermeasure against the problem. Accordingly, in the technology described in Patent Literature 1, the driving lane may be inappropriately estimated based on erroneous white line information, and thus appropriate driving support may not be performed. Specifically, there is a fear that the own vehicle will travel at a position closer to a road edge line than to an appropriate position.

The present disclosure is provided to solve the aforementioned problem, and the main purpose is to provide a driving support apparatus that can prevent the own vehicle from traveling at a position closer to the actual road edge line than to the appropriate position even when the roadside is erroneously detected as being the road edge line when detecting, from an image captured by the in-vehicle camera, lane lines of a lane on which the own vehicle is traveling.

The present disclosure is a driving support apparatus including an in-vehicle camera for capturing an area ahead of the own vehicle in its traveling direction, a radar device for transmitting probing waves to an area ahead of the own vehicle in its traveling direction, and receiving reflected waves, a roadside detection unit for detecting, from information of the reflected waves received from the radar device, a roadside as a side of a road on which the own vehicle is traveling, a lane line detection unit for detecting, from an image captured by the in-vehicle camera, left and right lane lines that define a driving lane, a determination unit for determining whether an estimated width as a width of the roadside detected by the roadside detection unit and the lane line of a roadside side detected by the lane line detection unit is narrower than a predetermined width, and a driving support unit for performing a driving support for the own vehicle so as to maintain a lateral position of the own vehicle in a vehicle width direction in a predetermined position in an estimated driving lane as the driving lane estimated from the left and right lane lines detected by the lane line detection unit, wherein the driving support unit sets the predetermined position to be a position more distant from the lane line of a roadside side in the estimated driving lane when the determination unit determines that the estimated width is narrower than the predetermined width, than when the determination unit determines that the estimated width is not narrower than the predetermined width.

A lane line detection unit detects left and right lane lines that defines driving lanes from an image captured by an in-vehicle camera. Then, in the estimated driving lane estimated from the detected left and right lane lines, driving support for the own vehicle is performed so that the lateral position of the own vehicle is maintained at the predetermined position. In such a vehicle, when a wall or a guardrail exists on the roadside, the lane line detecting section is likely to erroneously recognize a wall pattern or the unevenness of the guardrail as a lane line. Specifically, when the width of the roadside as the side of the road, and the lane line on the roadside side detected by the lane line detection unit is narrower than the predetermined width, the lane line detection unit may be likely to erroneously detect the road edge line as the roadside. In this case, the estimated driving lane will be estimated based on erroneous white line information, and thus appropriate driving support may not be performed. Specifically, the own vehicle is likely to drive at the inappropriate position in the driving lane. Note that the roadway side as a side of the road exists further outside than the road edge line.

In the present embodiment, the roadside detection unit detects a roadside of the road from information of reflected waves received from the radar device. Accordingly, when the determination unit determines that the estimated width as the width of the roadside detected by the roadside detection unit and the lane line on the roadside side detected by the lane line detection unit, is narrower than the predetermined width, the lane line detection unit may be likely to erroneously detect a road edge line as the roadside.

Accordingly, when the determination unit determines that the estimated width is narrower than the predetermined width, the predetermined position is set in a position distant from the lane line on the roadside side in the estimated driving lane, than when the determination unit determines that the estimated width is not narrower than the predetermined width. Accordingly, when detecting, from the image captured by the in-vehicle camera, a road edge line for defining roads, even if the estimated driving lane is inappropriately estimated due to erroneous detection of the roadside as a road edge line, it is possible to prevent the own vehicle from traveling at a position closer to the actual road edge line than to the appropriate position.

BRIEF DESCRIPTION OF THE DRAWINGS

The object described above and other objects, features, and advantages of the present disclosure are clarified by the detailed description below with reference to the accompanying drawings. In the drawings:

FIG. 3 is a flowchart of the control performed by a detection ECU according to the present embodiment.

DESCRIPTION OF THE EMBODIMENTS

Figure 1:
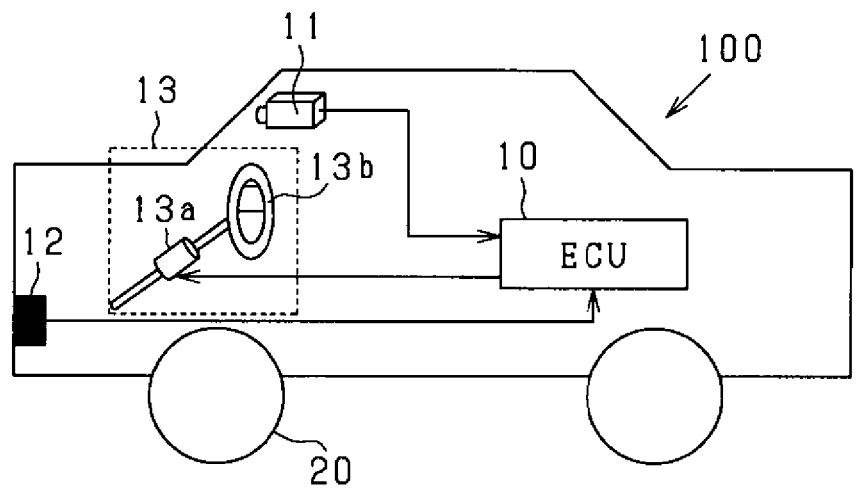
FIG. 1 is a schematic diagram of a preceding vehicle tracking system according to the present embodiment.

Referring to FIG. 1, the preceding vehicle tracking system 100 applied to a vehicle is described. The preceding vehicle tracking system 100 includes a detection ECU 10, an imaging device corresponding to an in-vehicle camera) 11, a radar device 12 and an electric power steering 13.

The imaging device 11 is, for example, a CCD camera, a CMOS image sensor, a near infrared camera, and the like. The imaging device 11 is mounted at a predetermined vertical position of the own vehicle that is the center of the own vehicle in the lateral direction to capture a bird's-eye-view image of a region extending with a predetermined angular range ahead of the own vehicle, and outputs the captured image information to the detection ECU 10. The imaging device 11 may be a single lens camera or a stereo camera.

The radar device 12 is a known millimeter-wave radar, for example, that uses a high frequency signal in the millimeter waveband as transmission waves, and is mounted to a front end part of the own vehicle. In the radar device 12, an area within a predetermined detection angle is defined as a detection range capable of detecting a target, and the position of a target within a detection range (referred to as a radar detection target) is detected. Specifically, the radar device 12 transmits probing waves at a predetermined cycle to receive reflected waves using a plurality of antennas. The radar device 12 calculates the distance to the radar detection target using the transmission time of the probing waves and the reception time of the reflection waves. Furthermore, a relative speed is calculated using the frequency of the waves reflected from the radar detection target which have changed by the Doppler effect. In addition, the radar device 12 calculates the direction of a radar-detection target, based on the phase difference between the reflected waves received by the plurality of antennas. If the distance and direction of a radar-detection target can be calculated, then the relative position of the radar-detection target with respect to the own vehicle can be specified. The radar device 12 cyclically transmits probing waves, receives reflected waves, and calculates the relative position and the relative speed, and then transmits the calculated relative position and the relative speed to the detection ECU 10.

The detection ECU 10 is connected to the imaging device 11 and to the radar device 12. The detection ECU 10 is a computer including a CPU, RAM, ROM, an I/O, and the like. The CPU executes programs installed in the ROM to realize various functions. Therefore, the detection ECU 10 corresponds to a roadside detection unit, a lane line detection unit, a determination unit, a calculating unit and a driving support cancellation unit.

In the present embodiment, a plurality of programs is installed in the ROM. The installed programs in particular are a white line detection program, a lane keeping assist (LKA) control program, a change torque amount calculation program and an LKA cancellation program.

In the white line detection program, the detection ECU 10 detects, from an image information captured by the imaging device 11, a white line as the lane line that defines a lane (hereinafter referred to as the own lane) where the own vehicle travels.

Specifically, the imaging device 11 extracts changing points of the contrast (e intensity) between a whiteline, which defines a lane, and a road surface as edge candidate points, based on luminance of the image captured by the imaging device 11. Then, a candidate line of a boundary line is extracted from the series of extracted edge candidate points. More specifically, image information acquired from the imaging device 11 is continuously processed at a predetermined sampling period, and a plurality of points whose luminance rapidly changes in the horizontal direction of the image are extracted as edge candidate points. Then, Hough transformation is applied to the series of extracted edge candidate points to acquire a series of edge candidate points, and a plurality of candidate lines having a series of acquired edge candidate points as left and right contours are extracted.

Then, with respect to each of the plurality of candidate lines, the degree of having the feature as the boundary line (white line) for defining a lane is calculated at each edge candidate point. Among these candidate lines, one having the greatest degree of feature is detected as a white line for defining a lane. Among the detected white lines, the left and right white lines which are approaching the own vehicle, and are arranged so as to include the own vehicle, are recognized as white line for defining lines (hereinafter referred to as own lane) on which the own vehicle is traveling.

In LKA control program, a detection ECU 10 performs an LKA control. The LKA control is a steering control for controlling the traveling direction of the own vehicle so that the lateral position of the own vehicle in the vehicle width direction is maintained at the predetermined position in the own lane estimated from the detected white line (hereinafter referred to as estimated own lane). In the present embodiment, the predetermined position is set to a lateral position indicating the center in the estimated own lane. Note that, the predetermined position is not limited to the lateral position indicating the center in the estimated own lane and may be set to a lateral position other than the center in the estimated own lane.

The own vehicle includes an electric power steering 13 as a safety device that is driven by a steering command. The detection ECU 10 and the electric power steering 13 correspond to a driving support unit.

The electric power steering 13 includes a steering 13b for operating a steering angle of the steering wheel 20 that the vehicle has, and a steering motor (corresponds to a motor) 13a. The steering motor 13a generates a steering force (torque) for assisting the operating force of the steering wheel 13b. The larger the torque, the larger the steering angle of the steering wheel 20 becomes. The steering motor 13a generates a steering force (torque) for operating the steering 13b when the LKA control is performed.

In the change torque amount calculation program, the detection ECU 10 calculates the change torque amount described later generated in the output shaft of the steering motor 13a.

In the LKA cancellation program, the detection ECU 10 cancels the LKA control if the steering 13b is operated by the driver during the LKA control to generate a torque for changing the traveling direction of the own vehicle (hereinafter referred to as change torque) generated in the steering motor 13a. Specifically, when the change torque amount generated on the output shaft of the steering motor 13a is larger than the first threshold, the LKA control is cancelled by the LKA control program. The change torque amount is calculated by the detection ECU 10 as the change torque amount calculation program is performed.

Figure 2:
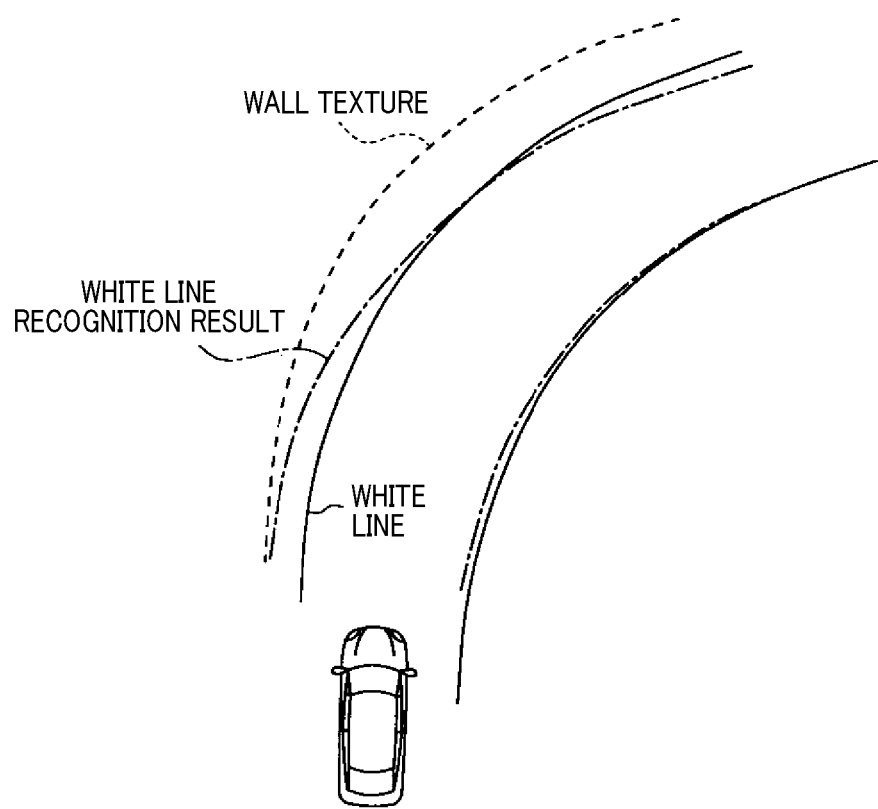
FIG. 2 is a diagram illustrating a state in which a stationary object present on a roadside is erroneously detected as a road edge line.

Let us assume that the detection ECU 10 performs the LKA control on the own vehicle while the own vehicle is traveling on the road where the wall or the guardrail is present at the roadside as the side of the road where the vehicle can travel. In this case, when a wall or a guardrail on the roadside is included in image information captured by the imaging device 11, a pattern of the wall or an uneven part of the guardrail may be erroneously recognized as being a white line (road edge line) of the road. FIG. 2 shows an example of a case where a wall pattern is erroneously detected as a road edge line, and from the erroneously detected road edge line and from the other white line, it can be understood that the own lane is inappropriately estimated. In this case, since the LKA control is performed based on the inappropriately estimated own lane, the own vehicle may be likely to travel on the roadside side rather than the center of the actual own lane. Note that the roadway side as a side of the road exists further outside than the road edge line.

In the present embodiment, the ROM further includes a roadside detection program, a width calculation program and a determination program.

In the roadside information acquisition program, the detection ECU 10 obtains a positional information on a stationary object (for example, guardrails, walls or etc.) present along the lane on the roadside where the own vehicle is driving, based on the information of a reflected wave received from the radar device 12.

In the width calculation program, the detection ECU 10 calculates an estimated width from the roadside to the road edge line using the obtained positional information of a stationary object present on a roadside and a positional information of a whiteline of the roadside (hereinafter referred to as road edge line) detected through performing the white line detection program.

In the determination program, the detection ECU 10 determines whether the estimated width from the roadside to the road edge line calculated by the width calculation program is narrower than the predetermined width which is set narrower than the minimum width from the width of the existing road edge line to the roadside.

When the calculated estimated width from the roadside to the road edge line is narrower than the predetermined width, the detection ECU 10 has likely erroneously detected a stationary object present on the roadside as a road edge line. Accordingly, under the LKA control, when it is estimated that the estimated width of the roadside to the road edge line is narrower than the predetermined width, the detection ECU 10 sets the predetermined position to a position distant from the road edge line than to the center of the estimated own lane by the detected white line.

Let us assume a case where a great difference exists between the positional information of the detected road edge line and the position of the actual road edge line, when the detection ECU 10 determines that the calculated estimated width from the roadside to the road edge line is narrower than the predetermined width (when a stationary object present on the roadside is recognized as a road edge line). In this case, even if the predetermined position is set to a position distant from the road edge line than to the center in the estimated own lane, the own vehicle may be likely to travel while keeping the lateral position of the own vehicle in the vehicle width direction closer to the road edge line side than to the center in the actual own lane. On the other hand, in a situation where the calculated estimated width from the roadside to the road edge line is narrower than the predetermined width, it is assumed that the difference between the positional information of the detected road edge line and the actual position of the road edge line is minute. In this case, when the predetermined position is set to a position distant from the road edge line than to the center of the estimated own lane, the own vehicle may be likely to travel while maintaining its lateral position in the vehicle width direction in a position distant from the road edge line than to the center of the actual own lane.

Under these circumstances, the own vehicle may travel with the lateral position of the own vehicle in the vehicle width direction being maintained at an inappropriate position within the own lane. It is therefore considered that the driver who feels dissatisfied with the situation may operate the steering wheel 13b in the direction of allowing the own vehicle to move toward the center of the actual own lane. In this case, the steering 13b is operated by the driver so that a change torque larger than the first threshold is generated in the output shaft of the steering motor 13a. In detail, when the present LKA control is performed in a situation where the calculated estimated width from the roadside to the road edge line is narrower than the predetermined width, the LKA control is highly likely to be canceled by the LKA cancellation program. Thus, if the detection ECU 10 determines that the calculated estimated width from the roadside to the road edge line is narrower than the predetermined width, and if the change torque amount is larger than the second threshold which is set smaller than the first threshold, the detection ECU 10 cancels the LKA control by executing the LKA cancellation program. Accordingly, the LKA control can be easily cancelled, when the detection ECU 10 is likely to erroneously detect a roadside as a road edge line in the white line detection program.

In the present embodiment, the LKA control in FIG. 3 described later is performed by the detection ECU 10. The detection ECU 10 cyclically performs a deviation avoidance control described in FIG. 3 while the power supply for the detection ECU 10 is on.

Firstly, in step S100, the positional information of a White line defining the own lane is obtained based on image information captured by the imaging device 11. In step S110, the radar device 12 obtains positional information of a stationary object present on a roadside.

In step S120, of the positional information f the White line acquired in step S100, it is determined whether the estimated width of the white line corresponding to the road edge line and the stationary object present on the roadside acquired in step S110 is narrower than the predetermined width. If YES in step S120, control proceeds to step S130.

In step S130, the predetermined position is set to a position distant from the road edge line than to the center in the estimated own lane estimated from the white line detected in step S100. The target torque amount (control variable) to be generated in the steering motor 13a is calculated so that the own vehicle travels while maintaining the predetermined position where the lateral position of the own vehicle in the vehicle width direction is set.

In step S140, a cancellation threshold used for determining whether to cancel the LKA control, is set as the second threshold. In step S150, the steering motor 13a is caused to generate a target torque amount calculated in step S130 or step S180 described later so as to perform the LKA control.

In step S160, the change torque amount generated in the steering motor 13a is calculated. In step S170, it is determined whether the change torque amount calculated in step S160 is larger than the cancellation threshold set in step S140 or step S190 described later. If NO in step S170, the control is ended. If YES in step S170, control proceeds to step S200, and the LKA control is stopped, and the process ends.

Meanwhile, if NO in step S120, control proceeds to step S180. In step S180, the predetermined position is set to a lateral direction indicating the center in the estimated own lane which is estimated from a white line obtained in step S100. Then, the target torque amount to be generated in the steering motor 13a is calculated so that the own vehicle travels while maintaining the predetermined position where the lateral position of the own vehicle in the vehicle width direction is set. In step S190, the cancellation threshold is set to the first threshold and then proceeds to step S150.

The present embodiment having the above configuration may accomplish the following advantageous effects.

The detection ECU 10 detects positional information of a stationary object present on a roadside obtained by the radar device 12. When it is determined that the estimated width from the roadside to the road edge line is narrower than the predetermined width, the stationary object present on the roadside may be recognized as being erroneously detected as the road edge line.

Accordingly, the predetermined position is set to a position distant from the road edge line than to the center in the estimated own lane which is estimated from the detected white line, when the calculated estimated width from the roadside to the road edge line is determined as being not narrower than the predetermined width. Accordingly, the own vehicle can be prevented from traveling at a position close to the roadside.

The aforementioned embodiment may be modified and implemented as described below.

In the aforementioned embodiment, an LKA cancellation program is installed in the ROM provided in the detection ECU 10. The detection ECU 10 may include the ROM with no LKA cancellation program being installed. Since the LKA control can also be performed in this case, the operation and effect similar to the aforementioned embodiments are exhibited.

In the aforementioned embodiment, when the determination program determines that the estimated width from the roadside to the road edge line calculated by the width calculation program is narrower than the predetermined width during the LKA control, the LKA control program sets the predetermined position to be a position distant from the road edge line than to the center in the estimated own lane. Regarding this fact; when the determination program determines that the estimated width from the roadside to the road edge line calculated by the width calculation program is narrower than the predetermined width, the LKA control program may set the predetermined position to a position close to the white line positioned opposite to the road edge line in the estimated driving lane. Accordingly, this configuration provides the same advantageous effects as those of the aforementioned embodiment.

The present disclosure has been described by way of examples; however, the present disclosure should not be construed as being limited to these examples or structures. The scope of the present disclosure should encompass various modifications or equivalents. In addition, a category or range of thought of the present disclosure encompasses various combinations or forms and other combinations or forms including only one element, one or more elements, or one or less elements of those.

The invention claimed is:

1. A driving support apparatus comprising:
an in-vehicle camera for capturing an area ahead of an own vehicle in a traveling direction;
a radar device for transmitting probing waves to an area ahead of the own vehicle in traveling direction, and receiving reflected waves;
a memory;
a processor communicable to the memory; and
a set of computer-executable instructions stored on the memory that cause the processor to implement:
detecting, from information of the reflected waves received from the radar device, roadsides as sides of a road on which the own vehicle is traveling, each roadside comprising a lateral roadside terminus of the road;
detecting, from an image captured by the in-vehicle camera, left and right lane lines that define a driving lane;
determining whether an estimated width as a width between a first roadside among the detected roadsides and the detected lane line of a first roadside side is narrower than a predetermined width; and
performing driving support for the own vehicle so as to maintain a lateral position of the own vehicle in a vehicle width direction at a predetermined position in an estimated driving lane as the driving lane estimated from the detected left and right lane, the predetermined position indicating a position within the estimated driving lane with respect to the lane line of the first roadside side,
wherein:
the processor sets the predetermined position to be a position more distant from the lane line of the first roadside side in the estimated driving lane when determining that the estimated width is narrower than the predetermined width, than when determining that the estimated width is not narrower than the predetermined width, and
the own vehicle includes an electric power steering for controlling the traveling direction of the own vehicle using output torque of a motor,
wherein
the processor:
controls the electric power steering so that the own vehicle travels by maintaining the predetermined position;
calculates a change torque amount when a driver operates the electric power steering so that a change torque for changing the traveling direction of the own vehicle is generated;
calculates the driving support when the calculated change torque amount is larger than a first threshold in a condition where the driving support is performed and where the estimated width is not narrower than the predetermined width; and
cancels the driving support when the calculated change torque amount is larger than a second threshold which is set smaller than the first threshold, under the condition where the driving support is performed and where the estimated width is narrower than the predetermined width.

2. The driving support apparatus according to claim 1, wherein the predetermined position is the lateral position indicating a center in the estimated driving lane when determining that estimated width is not narrower than the predetermined width.

3. A driving support apparatus comprising:
an in-vehicle camera for capturing an area ahead of an own vehicle in a traveling direction;
a radar device for transmitting probing waves to an area ahead of the own vehicle in the traveling direction, and receiving reflected waves;
a memory;
a processor communicable to the memory; and
a set of computer-executable instructions stored on the memory that cause the processor to implement:
- detecting, from information of the reflected waves received from the radar device, roadsides as sides of a road on which the own vehicle is traveling, each roadside comprising a lateral roadside terminus of the road;
- detecting, from an image captured by the in-vehicle camera, left and right lane lines that define a driving lane;
- determining whether an estimated width as a width between a first roadside among the detected roadsides and the detected lane line of a first roadside side is narrower than a predetermined width; and
- performing driving support for the own vehicle so as to maintain a lateral position of the own vehicle in a vehicle width direction in a predetermined position in an estimated driving lane as the driving lane estimated from the detected left and right lane lines, the predetermined position indicating a position within the estimated driving lane with respect to the lane line of the first roadside side, wherein:
the processor sets the predetermined position at a position closer to the lane line of a second roadside side positioned opposite to the lane line of the first roadside side in the estimated driving lane when determining that the estimated width is narrower than the predetermined width, than when determining that the estimated width is not narrower than the predetermined width, and
the own vehicle includes an electric power steering for controlling the traveling direction of the own vehicle using output torque of a motor, wherein
the processor;
- controls, by the electric power steering, so that the own vehicle travels by maintaining the predetermined position;
- calculates a change torque amount when a driver operates the electric power steering so that a change torque for changing the traveling direction of the own vehicle is generated;
- calculates driving support when the change torque amount is larger than a first threshold in a condition where the driving support is performed and where the estimated width is not narrower than the predetermined width; and
- cancels the driving support when the calculated change torque amount is larger than a second threshold which is set smaller than the first threshold, under the condition where the driving support is performed and where the estimated width is narrower than the predetermined width.

4. The driving support apparatus according to claim 3, wherein the predetermined position is the lateral position indicating a center in the estimated driving lane when determining that the estimated width is not narrower than the predetermined width.

* * * * *